United States Patent
Shamitz et al.

(10) Patent No.: US 8,128,265 B2
(45) Date of Patent: Mar. 6, 2012

(54) DEVICE FOR ILLUMINATING TARGET SURFACE INCLUDING AN INTEGRATED SWITCH

(75) Inventors: Robert Shamitz, Quincy, MA (US); William Harrop, Stoughton, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 110 days.

(21) Appl. No.: 12/270,598

(22) Filed: Nov. 13, 2008

(65) Prior Publication Data

US 2009/0129112 A1 May 21, 2009

Related U.S. Application Data

(60) Provisional application No. 60/987,760, filed on Nov. 13, 2007.

(51) Int. Cl.
*B60Q 1/56* (2006.01)
(52) U.S. Cl. .............. 362/497; 362/549; 362/800
(58) Field of Classification Search .......... 362/549, 362/497, 496
See application file for complete search history.

(56) References Cited

U.S. PATENT DOCUMENTS

| 5,029,053 | A | 7/1991 | Solow |
| 5,192,125 | A | 3/1993 | Gonzalez |
| 6,805,398 | B2 | 10/2004 | Harima |
| 7,222,998 | B2 | 5/2007 | Katase |
| 2007/0216770 | A1 | 9/2007 | Chang |

FOREIGN PATENT DOCUMENTS

EP 1533451 7/2006

OTHER PUBLICATIONS

International Search Report and Written Opinion dated Jan. 9, 2009 issued in related International Patent Application No. PCT/US2008/083403.

*Primary Examiner* — Robert May
*Assistant Examiner* — Leah S Macchiarolo
(74) *Attorney, Agent, or Firm* — Grossman, Tucker, Perreault & Pfleger, PLLC (57) ABSTRACT

A device for illuminating a target surface of a vehicle. The device includes a base and a top cover coupled to the base. The top cover includes a perimeter wall portion and an actuator portion coupled to the perimeter wall portion. The actuator portion extends generally downward between walls of the perimeter wall portion toward the base and is movable toward the base for changing the state of a switch upon application of an external force to the actuator portion. A light source is coupled to the base and positioned for illuminating the target surface through the actuator portion.

8 Claims, 12 Drawing Sheets

DEVICE FOR ILLUMINATING TARGET SURFACE INCLUDING AN INTEGRATED SWITCH

CROSS-REFERENCE TO RELATED APPLICATIONS

This application claims the benefit of the filing date of U.S. Provisional Application Ser. No. 60/987,760, filed Nov. 13, 2007, the entire teachings of which are hereby incorporated herein by reference.

TECHNICAL FIELD

This disclosure relates to vehicle assemblies, and, in particular, to a device for illuminating a target surface, e.g. a license plate, including an integrated switch.

BACKGROUND

Many vehicles are provided with light sources adjacent the vehicle license plate for illuminating the license plate or other target surface of the vehicle in low light conditions. Known license plate lighting devices may, for example, be installed above the license plate in a portion of the vehicle trunk or rear gate. Newer vehicles may also include a trunk or rear gate release disposed in the same general location as the license plate light. The gate release may include an electromechanical device, e.g. a solenoid, configured to release the gate upon user actuation of an associated switch.

In known vehicles, two separate wiring paths may be required for providing an electrical current to the separate license plate light and rear gate release modules. In vehicles incorporating a backing camera or radar, additional separate wiring paths and modules may be associated with these systems. The separate wiring paths and modules associated with the license plate light, rear gate release, backing camera or radar, etc. may require a cumbersome and expensive assembly procedure.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which.

DETAILED DESCRIPTION

Exemplary embodiments of a system and method consistent with the present disclosure described herein may involve an integrated system for illuminating a license plate and incorporating a rear gate release switch. The system may optionally incorporate a secondary door lock release switch and/or a rear facing parking camera. A system consistent with the present disclosure may utilize electrical connections such a flexible circuit board design, insert molded copper traces and/or other means to couple power and signals to light sources and the rear gate release switch. Advantageously, a device consistent with the present disclosure may allow mass production of a single, sealed module that replaces several components and incorporates a single vehicle electrical interface. Small overall size may allow the design to be incorporated into several vehicle platforms without the need for extensive customization.

Although embodiments described herein are described with reference illumination of a license plate, one of ordinary skill the art will recognize that a device consistent with the present disclosure may be used to illuminate any target surface of a vehicle, and is not limited to illumination of a license plate. It is to be understood that the embodiments described herein are presented by way of illustration, not of limitation.

Figure 1:
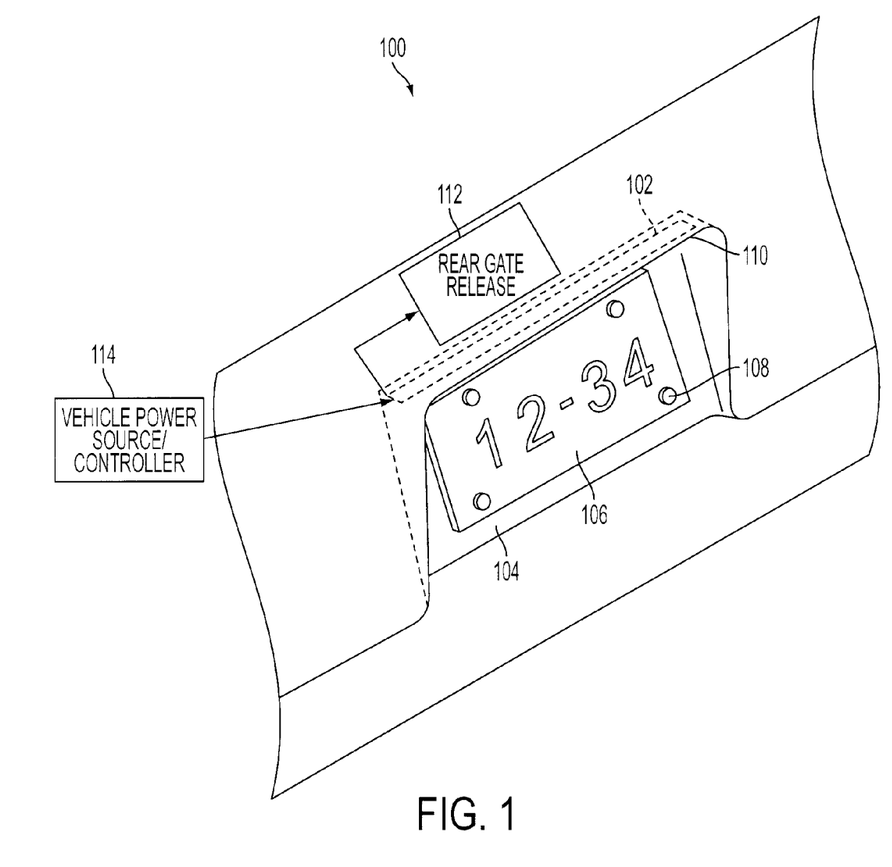
FIG. 1. is a perspective view of a rear portion of a vehicle including a device consistent with the present disclosure.

FIG. 1 illustrates a rear portion of a vehicle 100 including a device 102 consistent with the present disclosure. As shown, the vehicle may include a rear panel portion 104 including a license plate 106 affixed thereto, e.g. by one or more screws 108, and a hood portion 110. The hood portion 110 may form a rear gate or trunk cover of the vehicle and may be hinged for opening upon actuation of a rear gate release device 112.

The device 102 may be electrically coupled to the vehicle power source or controller 114, e.g. through a vehicle CAN bus, for energizing one or more light sources, e.g. light emitting diodes (LEDs) in the device 102 to provide illumination of the license plate 106 and/or ambient illumination. The device 100 may also be electrically coupled to the rear gate release 112 for energizing the rear gate release to release, i.e. open, the trunk or rear gate upon actuation of a switch in the device 102. Accordingly, the device may provide illumination of the license plate along with a user actuatable switch for energizing the rear gate release to open the trunk or rear gate.

The expression "electrically coupled" as used herein refers to any connection, coupling, link or the like by which electrical signals or energy carried by one system element are imparted to the "coupled" element. Such "electrically coupled" devices are not necessarily directly connected to one another and may be separated by intermediate electrical components or devices. Likewise, the terms "connected" or "coupled" as used herein in regard to physical connections or couplings is a relative term and does not require a direct physical connection.

Figure 2:
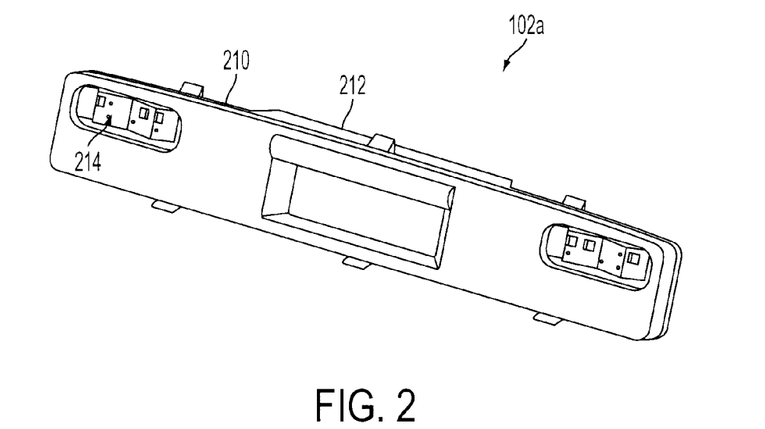
FIG. 2 is a front perspective view of one embodiment of a device consistent with the present disclosure.
Figure 3:
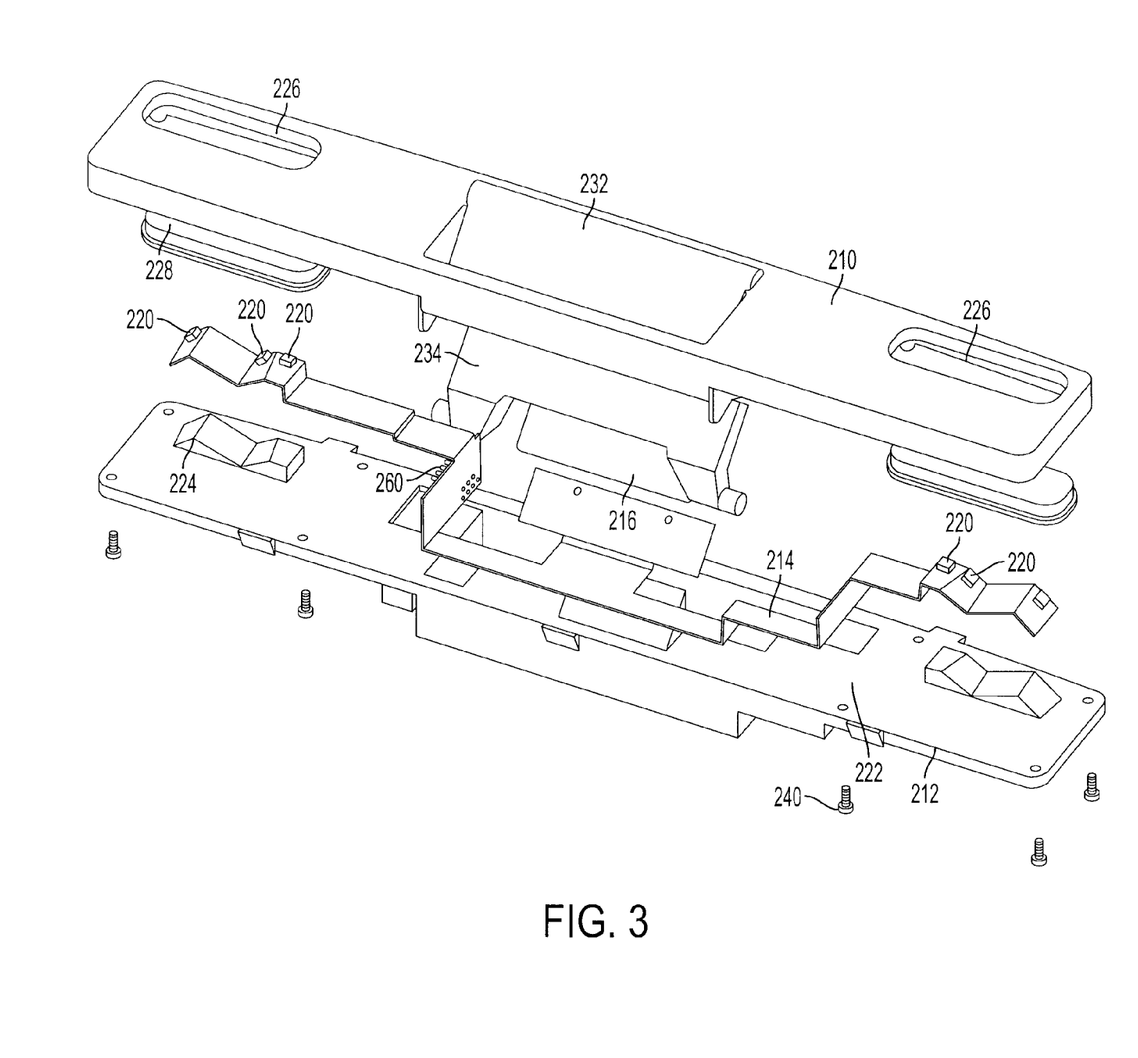
FIG. 3 is an exploded view of the device illustrated in FIG. 2.

Turning to FIGS. 2-3, there is shown one an exemplary embodiment of a device 102a consistent with the present disclosure. The illustrated exemplary embodiment generally includes an overmolded top cover 210, a base 212 and a flexible circuit portion 214. The base and top cover may be coupled using fasteners 240 (FIG. 3) to seal the assembly 102a from contaminants.

The flexible circuit 214 may include one or more electrically conductive traces for connecting components of the assembly 102a to, for example, a vehicle bus such as a CAN bus. The flexible circuit 214 may be constructed from any known flexible circuit material. As shown, a plurality of LED's 220 may be coupled to the flexible circuit in a manner allowing selective energization of the LED's, e.g. in response to a command from the vehicle bus, for providing illumination, e.g. of a vehicle license plate. A switch circuit 216, e.g. arranged on a circuit board may also be electrically coupled to the flexible circuit 214 for communication with the vehicle bus. The switch circuit may include on or more user-actuatable switches for energizing the rear gate release. The switches may be, for example, microswitches, dome contacts, capacitive touch sensors, etc.

The base 212 may have an interior surface configured for positioning the flexible circuit and the components thereon in a desired relationship to the top cover. As shown, for example, the interior surface of the base may include raised and angled orientation portions 224 around which the flexible circuit 214 may be deformed for causing a desired orientation of LEDs 220 thereon relative to illumination openings 226 on the top cover. Light from the LEDs arranged over the portions 224 may pass through the illumination openings 226 and associated covers 228 therefore for providing illumination, e.g. of a license plate. The base 212 may also include recesses for receiving portions of the flexible circuit coupled to the switch circuit 216 and receiving an associated switch actuator portion 232 of the top cover.

Figure 4:
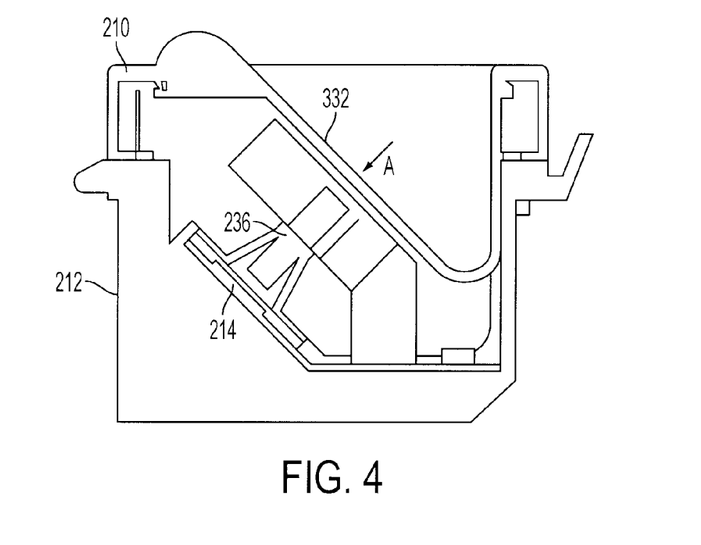
FIG. 4 is a sectional view of the device illustrated in FIG. 2.

When assembled, the switch actuator portion 232 of the top cover may be disposed adjacent an associated switch actuator 234 pivotally coupled to the assembly, whereby engagement of the switch actuator portion 232 by a user may cause rotation of a switch actuator 234. Upon rotation, the switch actuator 234 may contact and change the state of one or more switches 236, e.g. by depressing the switches, to energize the rear gate release. FIG. 4, for example shows a cross-section of a switch portion of the assembly 102a wherein a microcontact switch 236 is positioned adjacent a surface of the switch actuator portion of the top cover. When a user depresses the switch actuator portion 232, e.g. in the direction of arrow A, switch 236 may be depressed for changing the switch state and energizing the rear gate release to open the rear gate or trunk.

Figure 5:
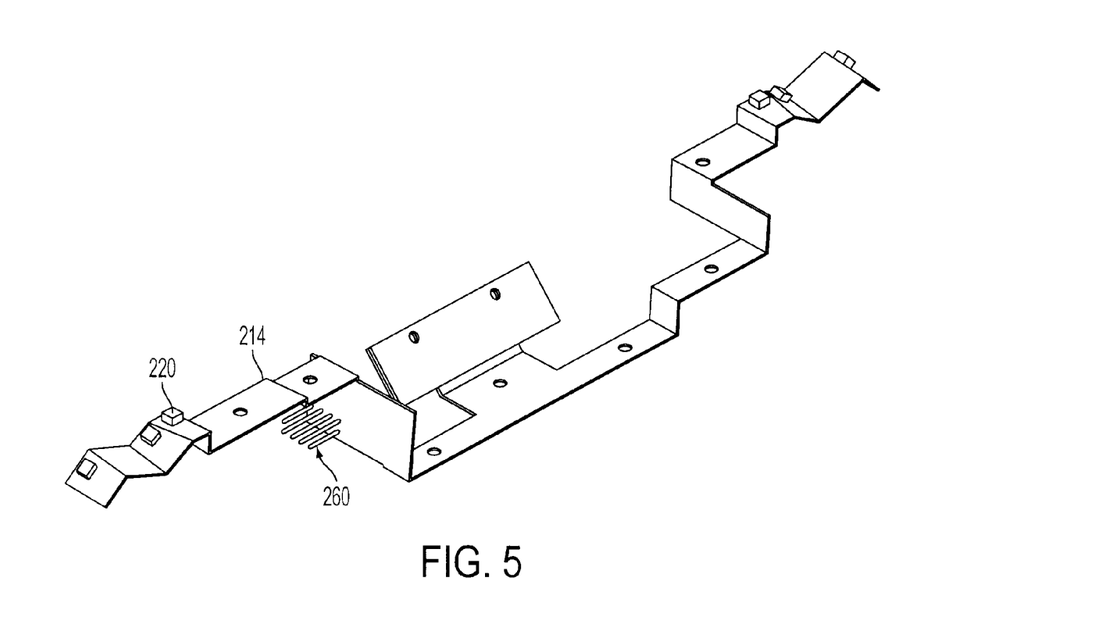
FIG. 5 is a perspective view of a flexible circuit portion of the device illustrate in FIG. 2.

FIG. 5 is a perspective view of the flexible circuit 214, which more particularly illustrates the orientation of the LEDs 220 and the input/output pins 260 for coupling the flexible circuit to the vehicle bus. Advantageously, the pins 260 provide a single location for coupling the vehicle bus to the LEDs, the gate release switch, and any other components (e.g. secondary switch and backup-camera) provided within the assembly.

Figure 6:
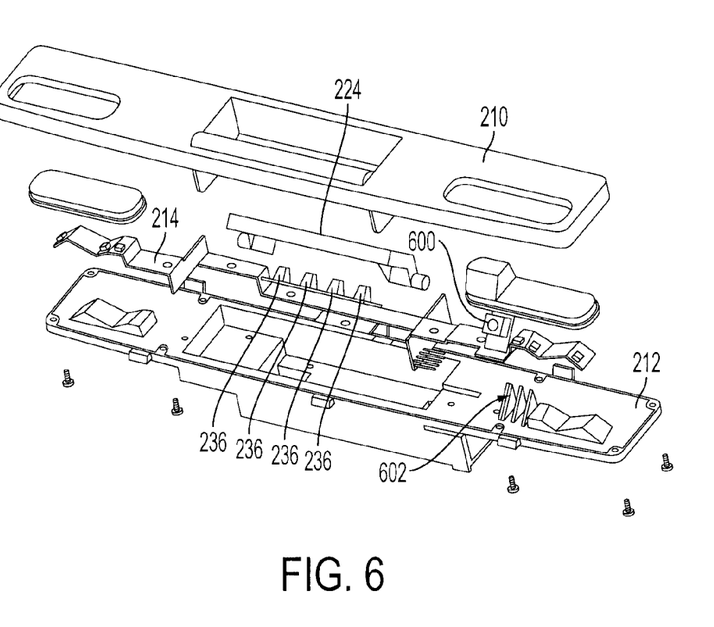
FIG. 6 is an exploded view of another embodiment of a device consistent with the present disclosure including a back up camera.
Figure 7:
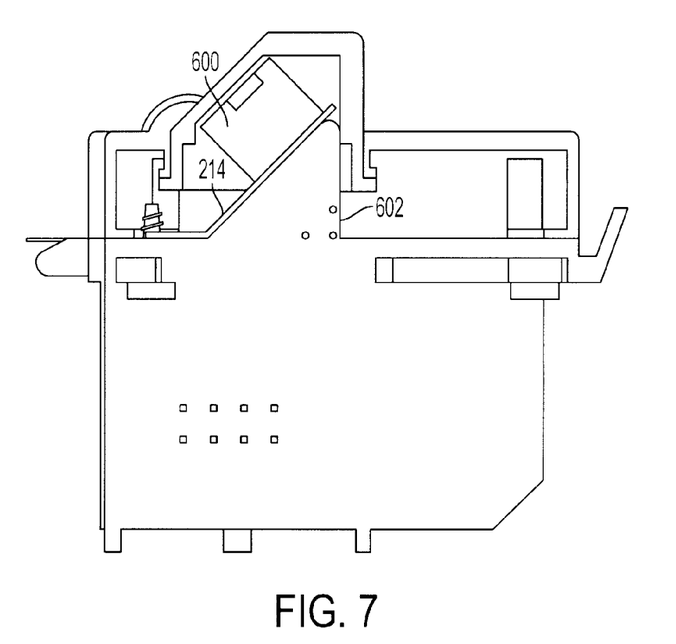
FIG. 7 is a sectional view of the embodiment illustrated in FIG. 6.

FIGS. 6 and 7 illustrate an exemplary assembly consistent with the present disclosure incorporating a back-up camera 600 for providing a video output to a driver to assist in backing up the vehicle. In the illustrated exemplary embodiment, the backup camera 600 is positioned adjacent one of the illumination openings 226 and the LEDs associated therewith. As shown in FIG. 6, the camera 600 may be electrically coupled to the flexible circuit 214 for electrically coupling the camera 600 to the vehicle bus to energize the camera and couple a video output to a vehicle operator. The base 212 may include one or more camera orientation features 602 for orienting the camera 600 in a desired position relative to the top cover 210. In the illustrated exemplary embodiment, for example, the base includes a portion 602 extending angularly outward therefrom for positioning the camera 600 in a desired position relative to the illumination opening.

Figure 8:
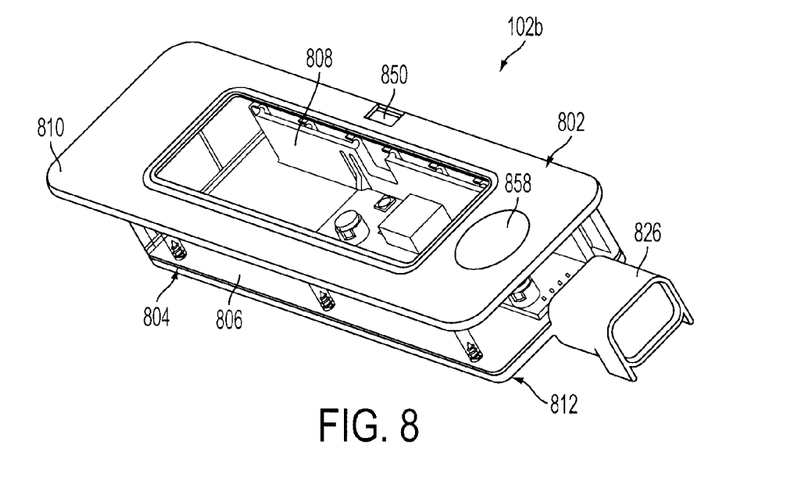
FIG. 8 is a top perspective view of another embodiment of a device consistent with the present disclosure.
Figure 9:
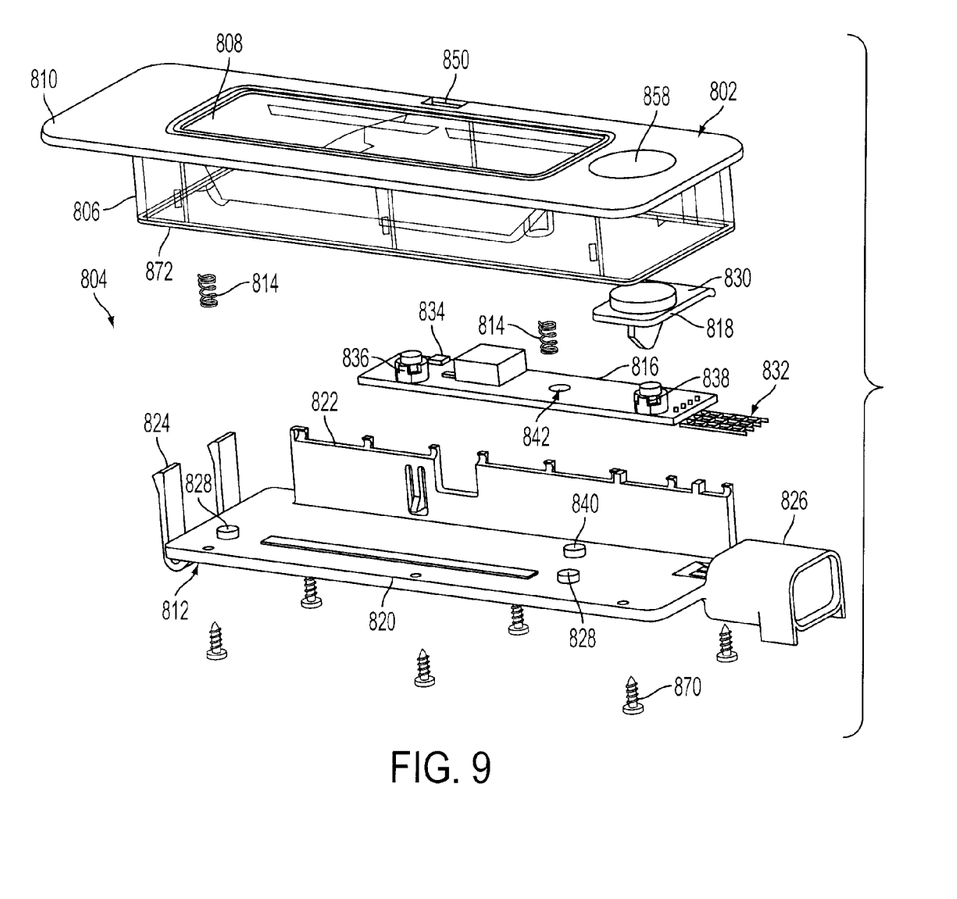
FIG. 9 is an exploded view of the device illustrated in FIG. 8.

FIGS. 8-12 illustrate another exemplary embodiment 102b of a device consistent with the present disclosure. As shown in FIGS. 8 and 9, the embodiment 102b generally includes a top cover assembly 802 and a base assembly 804. The top cover assembly 802 may include a perimeter wall portion 806, a lens/actuator portion 808, and an overmolded top portion 810 coupling the lens/actuator portion 808 to the perimeter wall portion 806. The base assembly 804 may include a base 812, one or more return springs 814, a printed circuit board (PCB) 816 and an optional secondary switch rocker 818.

Figure 10:
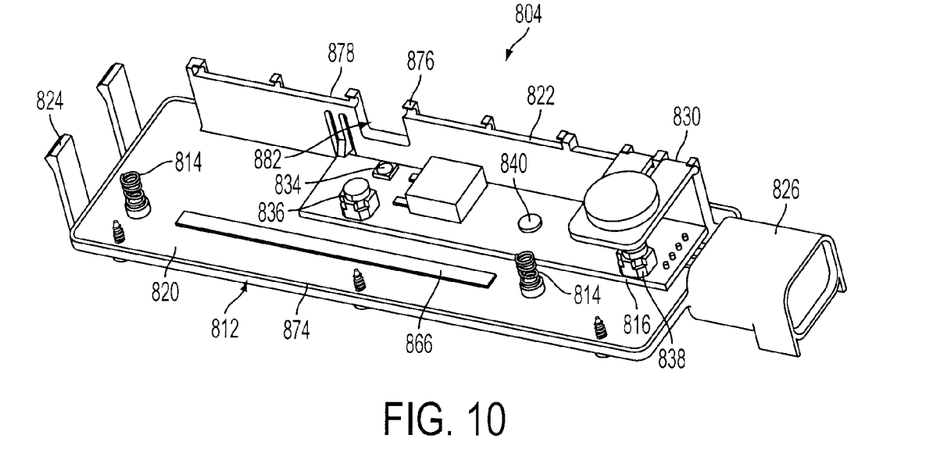
FIG. 10 is a top perspective view of a base assembly portion of the device illustrate in FIG. 8.

As shown also in FIG. 10, the base may be a molded plastic part including a generally planar bottom 820, a lens/actuator hinge 822 extending upward and generally perpendicularly from the bottom, one or more latches 824 for securing the device 102b to a vehicle and an integral connector 826, e.g. a 4-pin sealed connector. The return springs 814 may be mounted on posts 828 extending from the bottom of the base. The optional secondary switch rocker may have a first side 830 coupled to the lens/actuator hinge 822 so that is cantilevered from the lens/actuator hinge 822.

The PCB 816 may have a plurality of leads 832 extending into the connector for allowing facile electrical coupling of the device 102a to the vehicle power source/controller using a mating connector. One or more license plate illumination LEDs 834 may be coupled to the PCB 816, along with electronics for energizing the LEDS, one or more microswitches 836 for energizing the rear gate release upon user actuation, and optionally a microswitch 838 associated with the secondary switch rocker 818 for switching electrical energy to another vehicle system. The PCB 816 may be disposed on the bottom portion 820 of the base adjacent the lens/actuator hinge, and may include an opening 842 therethrough for receiving a post 840 extending from the bottom of the base for positive location of the PCB 816 relative to the base.

Figure 11:
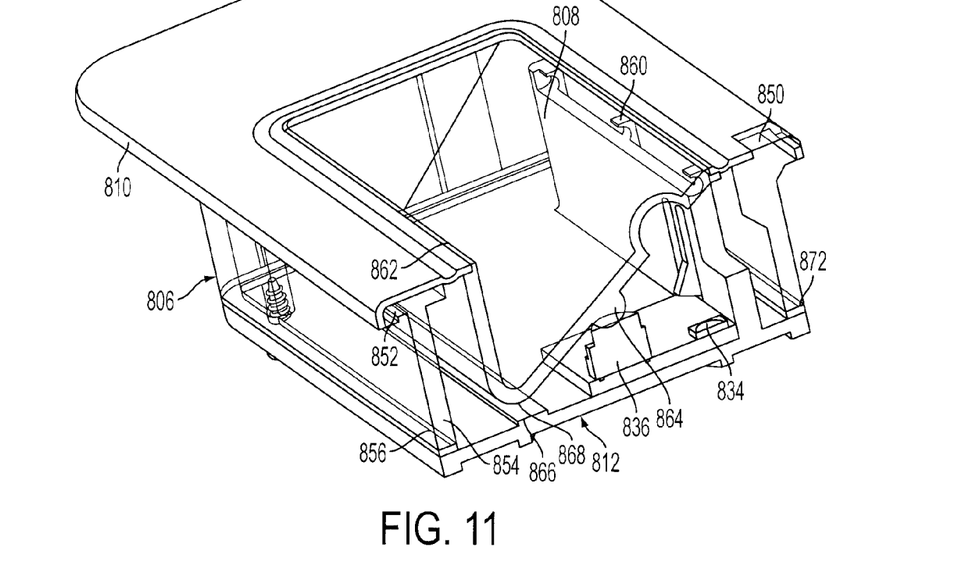
FIG. 11 is a sectional view of the device illustrated in FIG. 8.

With reference also to FIG. 11, the perimeter wall portion 806 may be a generally hollow member with a top portion 852 coupling an interior wall 854 to exterior wall 856 that is spaced from the interior wall 854 to provide a light pipe. The overmolded top portion 810 may cover the top portion 852 of the perimeter wall portion, but may be open in one or more areas to provide an ambient lighting opening(s) 850 that allows light, e.g. from LED 834, to pass through the top cover assembly to provide ambient lighting. The overmolded top portion 810 may also include a raised dome portion 858 positioned above the secondary switch rocker to provide tactile feedback associated with actuation of the secondary switch.

The lens/actuator portion 808 of the top cover assembly may be disposed between opposed walls of the perimeter wall portion and may have opposed sides 860, 862 coupled to the opposed walls of the perimeter wall portions by the overmolded top portion 810. The lens/actuator 808 may extend generally diagonally downward from one side 860 thereof and then generally perpendicularly upward to the opposed side thereof 862. A bottom surface of generally diagonally downward extending portion of the lens/actuator may have a switch interface portion 864 extending therefrom adjacent and positioned over the switch 836. Also, the bottom of the base may include an upwardly extending lens/actuator travel stop 866 positioned below the corner 868 of the lens/actuator portion 808.

The top cover assembly 802 may be secured to the base assembly 804 by one or more fasteners, e.g. screws 870, to seal the device from contaminants. To provide a seal between the top cover assembly 802 and the base assembly 804, a bottom overmold 872 on the bottom surface of the perimeter wall portion may pressingly engage a sealing rib 874 extending from a bottom of the base 820 when the top cover assembly 802 is secured to the base 804. When the top cover assembly and base assembly are joined, a hinge side 860 of the lens/actuator may be pivotally coupled to a top portion of the lens actuator hinge 822, e.g. by being captured between tabs 876 and an opposed top wall surface 878 of the lens/actuator hinge. The return springs impart 814 a force against the lens/actuator portion 808 to bias the lens/actuator portion upward, i.e. in a direction away from the switch 836.

In operation, the LED 834 may be energized by the vehicle power source/controller through electrical connections passing through the connector 826 and associated conductive traces on the PCB. Light from the LED 836 may pass directly through the lens/actuator portion 808 of the top cover assembly and/or may be reflected from the lens/actuator hinge 822 prior to passing through the lens/actuator portion 808. The lens/actuator 808 may thus function as a lens allowing light from the LED 236 to pass therethrough and into the area of the license plate.

Light from the LED 836 may also enter the light pipe formed in the perimeter wall portion 806 of the top cover assembly, e.g. through a notch 882 or other opening in the lens/actuator hinge 822, and may exit the light pipe through one or more ambient light openings 850 in the overmolded top cover to provide ambient lighting in the area adjacent the license plate. In one embodiment, light in the light pipe may reflect off the interior and exterior walls of the perimeter wall portion 806 before exiting through the ambient light opening 850.

In addition to functioning as a lens, the lens/actuator portion 808 may function as an actuator for changing a state of the switch 836 to energize a rear gate release. To actuate the switch, a user may impart a force along any portion of the lens/actuator 808 in an inward direction toward the switch 836 and against the bias of the return springs 814. The inward force on the lens actuator 808 may cause the lens/actuator to pivot about the lens/actuator hinge 822 and thereby cause the switch interface portion 864 of the lens/actuator to engage the switch 836 and change the state of the switch. Movement of the side 862 of the lens actuator may be accommodated by the flexible connection between the lens/actuator 808 and the overmolded top portion 810. Inward travel of the lens/actuator 808 may be limited by engagement of the corner 868 of the lens/actuator with the lens/actuator travel stop 866. Changing the state of the switch in this manner may cause actuation of the rear gate release to open the trunk or rear gate. When the force on the actuator is removed, the return springs 814 my force the lens actuator to pivot back to a position where the interface portion 864 is separated from the switch 836.

Figure 12:
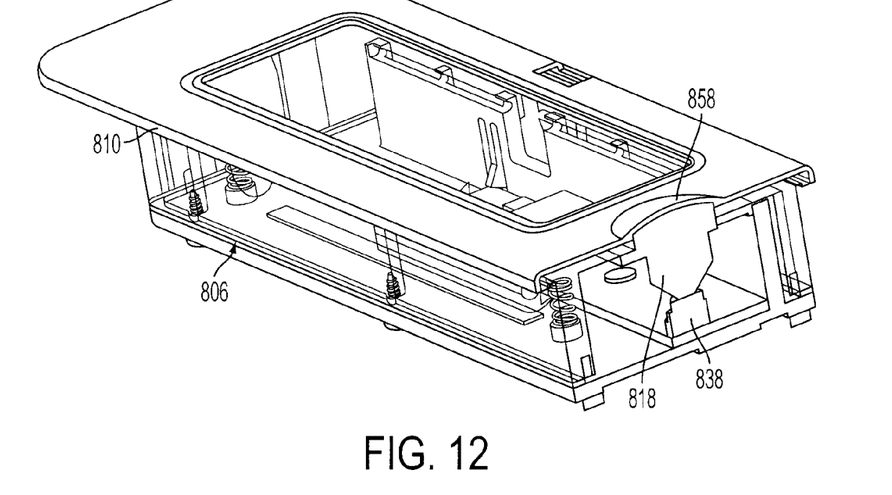
FIG. 12 is another sectional view of the device illustrate in FIG. 8.

With reference to FIG. 12, the optional secondary switch rocker 818 may be actuated by imparting a force on the dome portion 858 of the overmold portion. The force on the raised dome portion may deflect the secondary switch rocker inward until a bottom portion thereof contacts the switch and change state. The cantilevered connection of the secondary switch rocker to the lens/actuator hinge establishes a spring force biasing the secondary switch rocker away from the switch 838. When the force on the raised dome portion is removed, therefore, the secondary switch rocker may return to a position where the bottom portion thereof is spaced from the switch.

Figure 13:
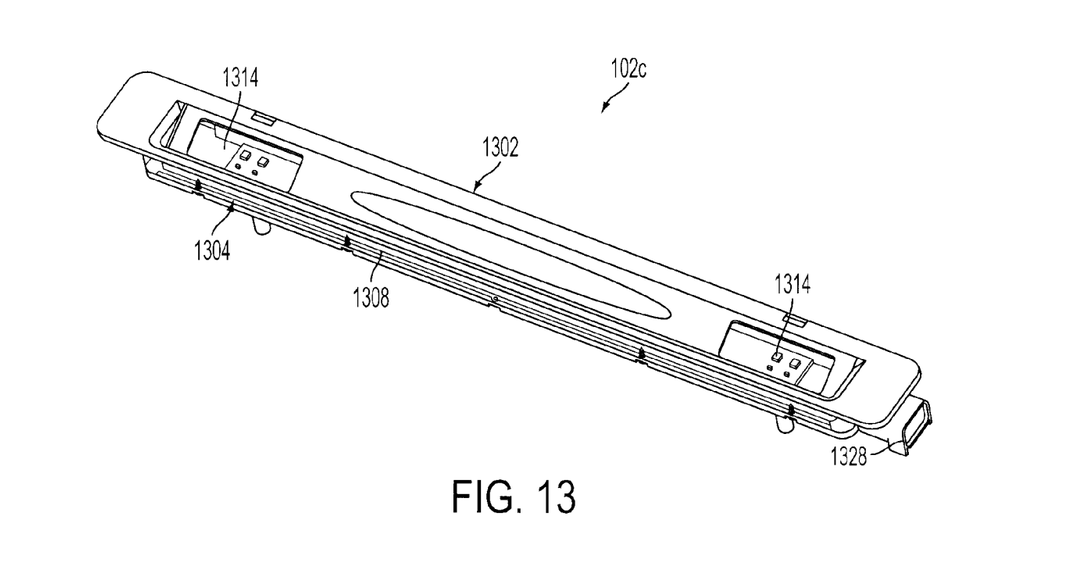
FIG. 13 is a top perspective view of another embodiment of a device consistent with the present disclosure.
Figure 14:
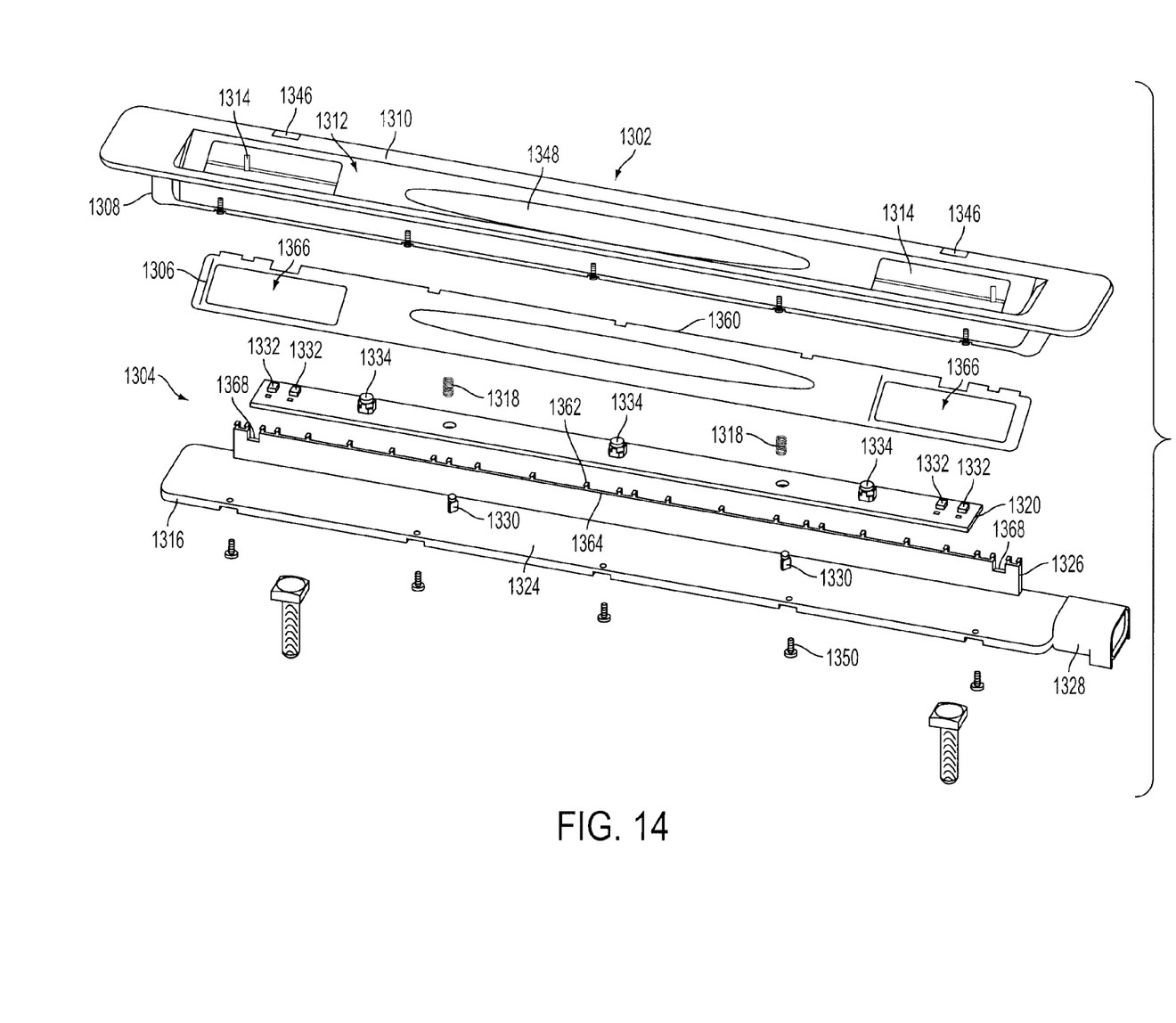
FIG. 14 is an exploded view of the device illustrated in FIG. 13.
Figure 14A:
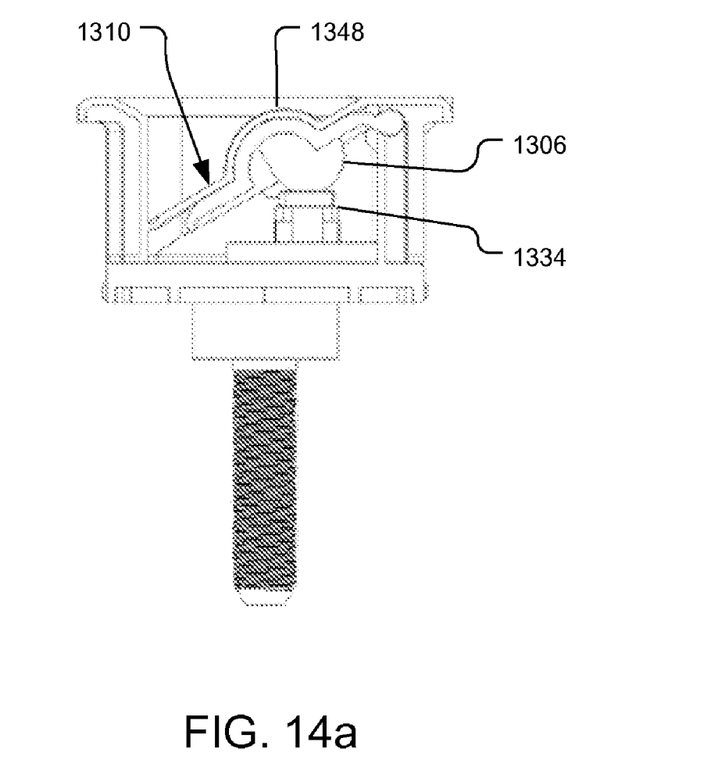
FIG. 14a is a side cross section of the device illustrated in FIGS. 13 and 14.

FIGS. 13, 14, 14a and 15 illustrate another exemplary embodiment 102c of a device consistent with the present disclosure. As shown in FIGS. 13 and 14, the embodiment 1300 generally includes a top cover assembly 1302, a base assembly 1304 and an actuator panel 1306. The top cover assembly 1302 may include a perimeter wall portion 1308 and an overmolded top portion 1310 including an actuator portion 1312 having one or more translucent lenses 1314. The base assembly may include a base 1316, one or more return springs 1318, and PCB 1320.

The base 1316 may be a molded plastic part including a generally planar bottom 1324, an actuator panel hinge 1326 extending upward and generally perpendicularly from the bottom, and an integral connector 1328, e.g. a 4-pin sealed connector. The return springs 1318 may be mounted on posts 1330 extending from the bottom of the base. The PCB 1320 may have a plurality of leads electrically conductive traces coupled to and corresponding to leads in the connector. One or more license plate illumination LEDs 1332 may be coupled to the PCB, along with electronics for energizing the LEDs, and one or more microswitches 1334 for energizing the rear gate release upon user actuation. The PCB 1320 may be disposed on the bottom portion of the base 1324 adjacent the lens/actuator hinge 1326.

Figure 15:
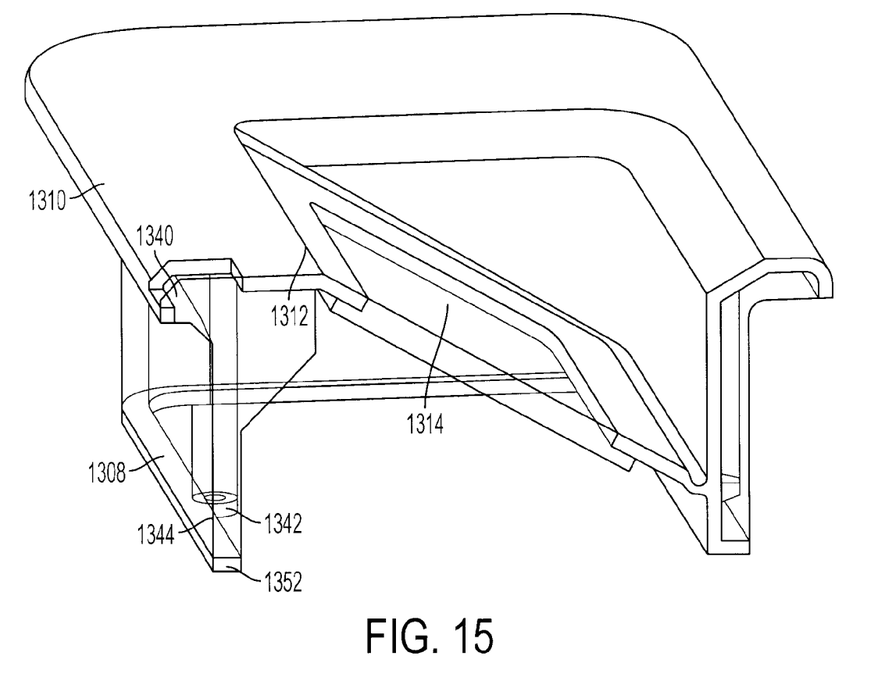
FIG. 15 is a sectional view of the device a top cover assembly portion of the device illustrated in FIG. 13.

With reference also to FIG. 15, the perimeter wall portion 1308 may be a generally hollow member with a top portion 1340 coupling an interior wall 1342 to exterior wall 1344 that is spaced from the interior wall 1332 to provide a light pipe. The overmolded top portion 1310 may cover the top portion 1340 of the perimeter wall portion, but may be open in one or more areas to provide an ambient lighting opening(s) 1346 that allows light, e.g. from LED 1332, to pass through the top cover assembly 1302 to provide ambient lighting. The overmolded top portion 1310 may also include a raised dome portion 1348 to provide tactile feedback associated with actuation of the rear gate release switches 1334.

The actuator portion 1312 of the overmolded top portion 1310 may be disposed between opposed walls of the perimeter wall portion 1308. The actuator portion 1312 may extend generally diagonally downward from one side of the perimeter wall portion toward the opposed side of the perimeter wall portion. One or more translucent lenses 1314 may be molded into the actuator portion of the overmolded top portion, e.g. as shown in FIG. 15. A bottom surface of generally diagonally downward extending portion of the actuator portion may be disposed against the actuator panel.

The top cover assembly 1302 may be secured to the base assembly by one or more fasteners 1350, e.g. screws, to seal the device from contaminants. To provide a seal between the top cover assembly 1302 and the base assembly 1308, a bottom overmold 1352 on the bottom surface of the perimeter wall may pressingly engage a sealing rib extending from a bottom of the base 1324 when the top cover assembly 1302 is secured to the base assembly 1304. When the top cover assembly and base assembly are joined, a hinge side 1360 of the actuator panel 1306 may be pivotally coupled to a top portion of the actuator panel hinge 1326, e.g. by being captured between tabs 1362 and an opposed top wall surface 1364 of the lens/actuator hinge 1326. The return springs 1318 impart a force against the actuator panel 1306 to bias the lens/actuator portion upward, i.e. in a direction away from the switches 1334. The actuator panel 1306 may include openings 1366 therein that are positioned to align with locations of the LEDs 1332 and with the lenses 1314 molded into the actuator portion of the top overmold.

In operation, the LEDs 1332 on the PCB may be energized by the vehicle power source through electrical connections passing through the connector 1328. Light from the LEDs may pass directly through the openings 1366 in the actuator panel and the lenses 1314 in the actuator portion of the top cover assembly and/or may be reflected from the actuator panel hinge 1326 prior to passing through the openings in the actuator panel and the lenses.

Light from the LED may also enter the light pipe formed in the perimeter wall portion of the top cover assembly, e.g. through one or more notches 1368 or other openings in the actuator panel hinge, and may exit the light pipe through one or more ambient light openings 1346 in the overmolded cover to provide ambient lighting in the area adjacent the license plate. In one embodiment, light in the light pipe may reflect off the interior and exterior walls of the perimeter wall portion before exiting through the ambient light opening.

The actuator portion may function as an actuator for changing a state of one or more of the switches 1334 to energize a rear gate release. To actuate the switch, a user may impart a force along any portion of the actuator portion 1312 in an inward direction toward the switches 1334 and against the bias of the return springs 1318. The inward force on the actuator portion 1312 may cause the actuator panel 1306 to pivot about the actuator panel hinge 1326 and thereby cause the actuator panel engage the switch and change the state of the switch. Inward movement of the actuator portion may be accommodated by the flexible nature of the top overmold portion of the top cover assembly. Changing the state of the switch in this manner may cause actuation of the rear gate release to open the trunk or rear gate. When the force on the actuator portion is removed, the return springs may force the actuator portion and actuator panel to pivot back to a position where the actuator panel 1306 is spaced from the switches 1334.

Figure 16:
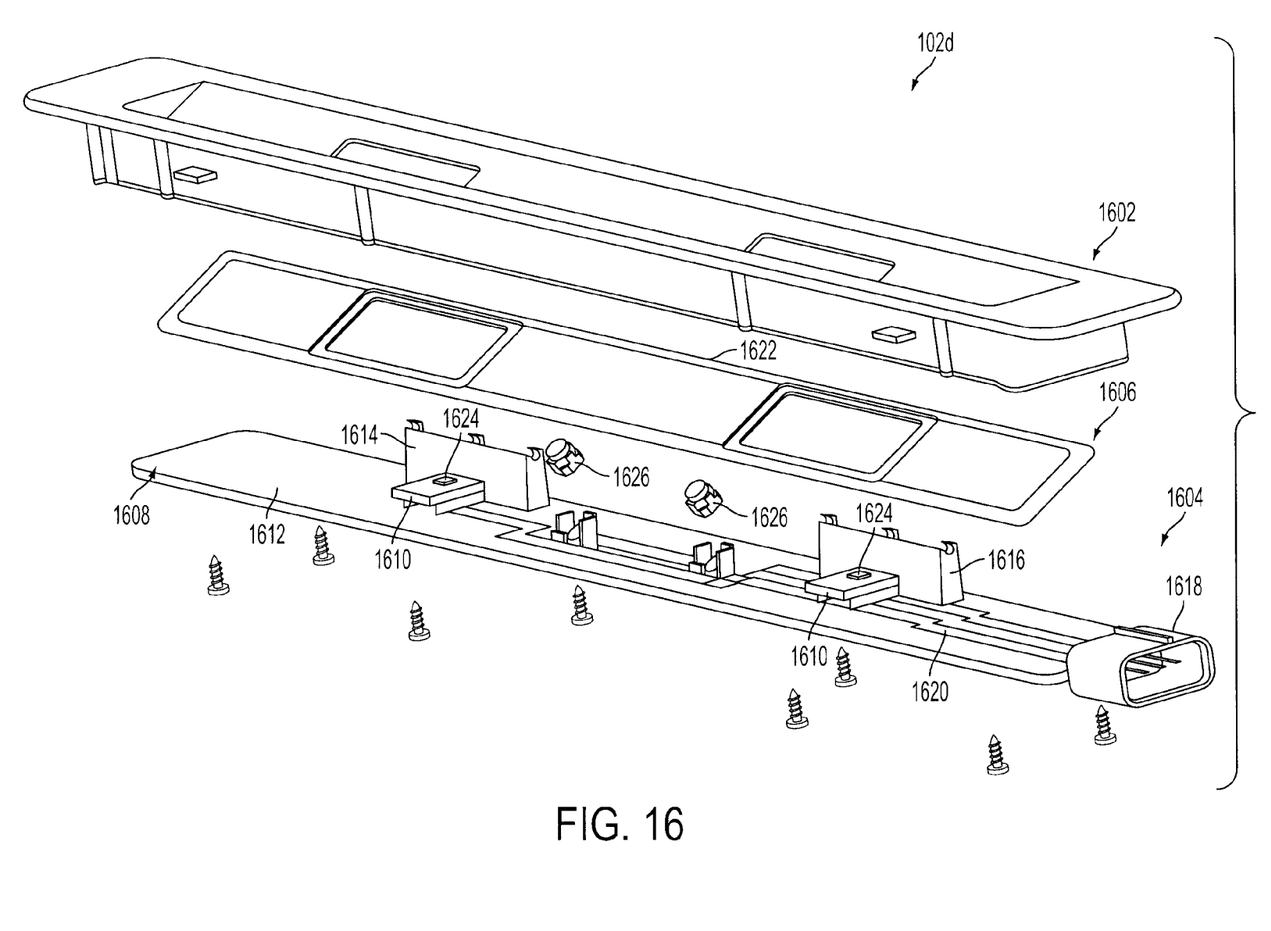
FIG. 16 is an exploded view of another embodiment of a device consistent with the present disclosure.

FIG. 16 illustrates another exemplary embodiment 102d of a device consistent with the present disclosure. The embodiment 102d includes a top cover assembly 1602, a base assembly 1604, and an actuator panel 1606. The top cover assembly 1602 and the actuator panel 1606 may be configured as described for example in connection with the embodiment illustrated in FIGS. 13-15. The base assembly 1604 may include a base 1608 and one or more separate PCBs 1610 carrying LEDs.

The base 1608 may be a molded plastic part including a generally planar bottom 1612, first 1614 and second 1616 actuator panel hinges extending upward and generally perpendicularly from the bottom, an integral connector 1618, e.g. a 4-pin sealed connector, and an insert molded lead frame 1620. One side of the actuator panel 1622 may be pivotally coupled to the first 1614 and second 1616 actuator panel hinges for pivotal movement relative thereto for actuating rear gate release switches. The insert molded lead frame 1620 may provide electrical connections to the separate PCBs 1610 for energizing the LEDs 1624 thereon. Light from the LEDs 1624 may pass directly through openings in the actuator panel and lenses in the top cover assembly and/or may be reflected through the openings and lenses for illuminating a license plate. As in the embodiment illustrated in FIGS. 13-15 a user may impart a force on an actuation portion of the top cover assembly to cause contact between the actuator panel and one or more switches 1626 to change the switch state and actuate a rear gate release.

Figure 17:
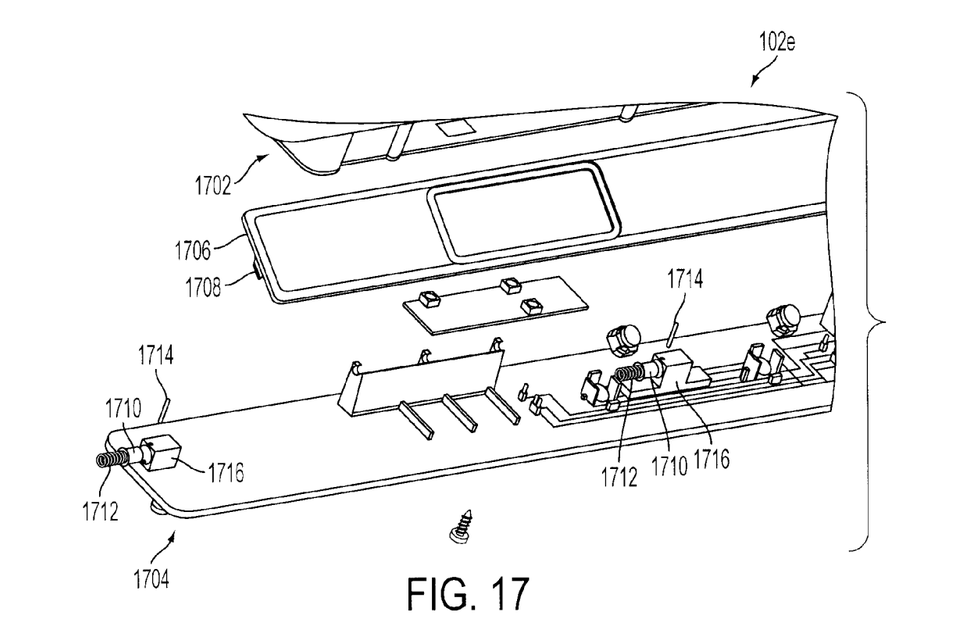
FIG. 17 is an exploded view of another embodiment of a device consistent with the present disclosure.
Figure 18:
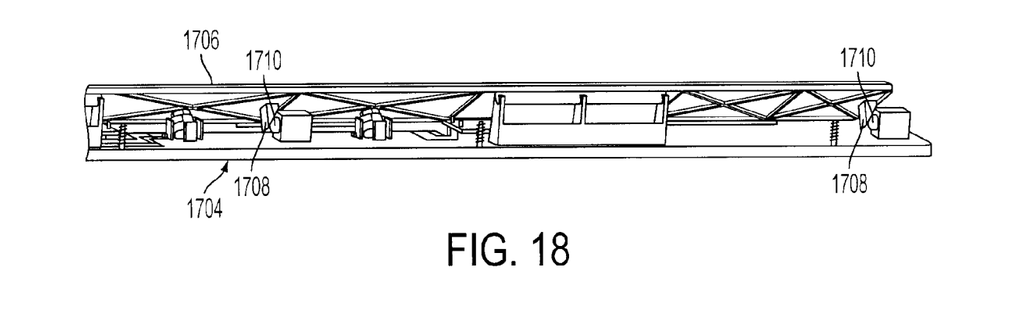
FIG. 18 is a rear view of a portion of the embodiment illustrated in FIG. 17.

FIGS. 17 and 18 illustrate another exemplary embodiment 102e of a device consistent with the present disclosure including detent plungers for providing positive tactile feedback of rear gate release switch actuation. The top cover assembly 1702, the base assembly 1704 and the actuator assembly 1706 may be configured as described for example in connection with the embodiment illustrated in FIG. 16. The base assembly 1704, however, may incorporate one or more detent plunger assemblies configured to engage associated detent contact projections 1708 on a bottom surface of the actuator panel.

In the illustrated exemplary embodiment each detent plunger assembly includes a detent 1710, a compression spring 1712, a pin 1714, and a detent receptacle 1716 extending upward from a bottom portion of the base. The detent receptacle 1716 may include in opening therethrough. One side of the opening may be dimensioned for receiving the detent 1710 and an opposite side of the opening may be dimensioned for allowing only a forward portion of the detent 1710 to extend therethrough. The detent 1710 may be inserted into the opening and compression spring 1712 may be inserted into the opening and compressed against a rear surface of the detent 1710. The compression spring may be retained within the opening the pin 1714 inserted through a top portion of the detent receptacle 1716. In this configuration, a forward portion of the detent 1710 is biased by the compression spring to extend outward from the detent receptacle, as shown in FIG. 18. When a user exerts a force against the actuator portion of the assembly 1706, detent contact projections 1708 on the actuator panel may contact the forward portion of the detent 1710 thereby forcing the detent into the detent receptacle 1716 against the bias of the spring 1712. The spring bias force transferred to the actuator portion 1706 may be sensed by the user to provide tactile feedback of actuation of the gate release switch.

According to one aspect of the disclosure, therefore, there is provided a device for illuminating a target surface of a vehicle, the device including: a base; a top cover coupled to the base, the top cover including a perimeter wall portion and an actuator portion coupled to the perimeter wall portion, the actuator portion extending generally downward between walls of the perimeter wall portion toward the base, the actuator portion being movable toward the base for changing the state of a switch upon application of an external force to the actuator portion; and a light source coupled to the base and positioned for illuminating the target surface through the actuator portion.

According to another aspect of the disclosure, there is provided a device for illuminating a target surface of a vehicle, the device including: a base including a bottom and an actuator hinge portion extending upward from the bottom; a light source coupled to the base; a switch coupled to the base; a top cover coupled to the base and at least partially enclosing the light source and the switch between the base and the top cover, the top cover including a perimeter wall portion and an actuator portion coupled to the perimeter wall portion, the actuator portion extending generally downward between walls of the perimeter wall portion toward the base with one side of the actuator portion being coupled to the actuator hinge portion, the actuator portion being movable toward the base for changing the state of the switch upon application of an external force to the actuator portion, the light source being positioned for illuminating the target surface through the actuator portion.

According to another aspect of the disclosure, there is provided an integrated system for illuminating a vehicle license plate and energizing a vehicle rear gate release, the system including: a vehicle power source; and an integrated illumination device positioned adjacent the vehicle license plate. The illumination device includes a base; a light source coupled to the base and to the vehicle power source; a switch coupled to the base and to the vehicle power source; and a top cover coupled to the base and at least partially enclosing the light source and the switch between the base and the top cover, the top cover including a perimeter wall portion and an actuator portion coupled to the perimeter wall portion, the actuator portion extending generally downward between walls of the perimeter wall portion toward the base, the actuator portion being movable toward the base for changing the state of the switch upon application of an external force to the actuator portion for coupling the vehicle power source through the switch to the rear gate release, the light source being positioned for illuminating the target surface through the actuator portion.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Also features of any embodiment described herein may be combined or substituted for features of any other embodiment described herein.

For example, detent plungers described in connection with FIGS. 17 and 18 may be incorporated into any embodiment herein for interaction with a detent contact projection on an actuator panel or lens/actuator portion. Also, a base with an insert molded lead frame may be provided in any embodiment. Also, the various features of the embodiments described herein may be considered optional and may be removed from any embodiment described herein. For example, the secondary switch rocker described in connection with the embodiment of FIG. 8 may be removed and/or the light pipe feature of the perimeter wall portion may be removed from any embodiment with or without removal of an associate ambient lighting feature. Also, in the embodiment of FIG. 8 the rear gate release switches may be removed to provide a configuration not adapted to perform an integrated gate release function. Such an embodiment may be useful, for example, when license plate illumination is required or desired but departure from the basic structure of the described embodiment is not cost effective. Other modifications, variations, and alternatives are also possible. Accordingly, the claims are intended to cover all such equivalents.

What is claimed is:

1. An integrated system for illuminating a vehicle license plate and energizing a vehicle rear gate release, said system comprising:
 a vehicle power source; and
 an integrated illumination device positioned adjacent said vehicle license plate, said illumination device comprising:
  a base;
  a light source coupled to said base and to said vehicle power source;
  a switch coupled to said base and to said vehicle power source;
  a top cover coupled to said base and at least partially enclosing said light source and said switch between said base and said top cover, said top cover comprising a perimeter wall portion and an actuator portion coupled to said perimeter wall portion, said actuator portion extending generally downward between opposed walls of said perimeter wall portion toward said base; and
  an actuator panel having a hinge side coupled to a hinge portion of said base, at least a portion of said actuator panel being movable toward said base against a bias force for changing the state of said switch upon application of an external force to at least a portion of said actuator portion for coupling said vehicle power source through said switch to said rear gate release, said light source being positioned for illuminating said vehicle license plate
  wherein at least a portion of said actuator portion comprises a translucent lens, said light source being positioned so that light therefrom passes through said translucent lens.

2. A system according to claim 1, wherein said base hinge portion extends upward from a bottom portion of said base, and wherein one side of said actuator panel is movably coupled to said actuator hinge portion.

3. A system according to claim 1, wherein said perimeter wall portion is coupled to said actuator portion by an overmolded top portion.

4. A system according to claim 1, wherein said perimeter wall portion comprises an inner wall portion, an outer wall portion spaced from said inner wall portion and a top portion coupling said inner and outer wall portions, and wherein light from said light source is configured to pass between said inner wall portion and said outer wall portion and through said top portion.

5. A system according to claim 1, wherein said light source and said switch are electrically coupled to contact pins of a connector portion of said base.

6. A system according to claim 1, wherein said actuator panel includes a switch interface portion extending from a bottom thereof adjacent said switch, said switch interface portion being configured to contact said switch upon said application of said force to change said state of said switch.

7. A system according to claim 1, wherein said device further comprises a raised dome portion configured to provide tactile feedback of said application of said external force.

8. A system according to claim 1, wherein said device further comprises a camera disposed between said top cover and said base.

* * * * *